Patented May 9, 1939

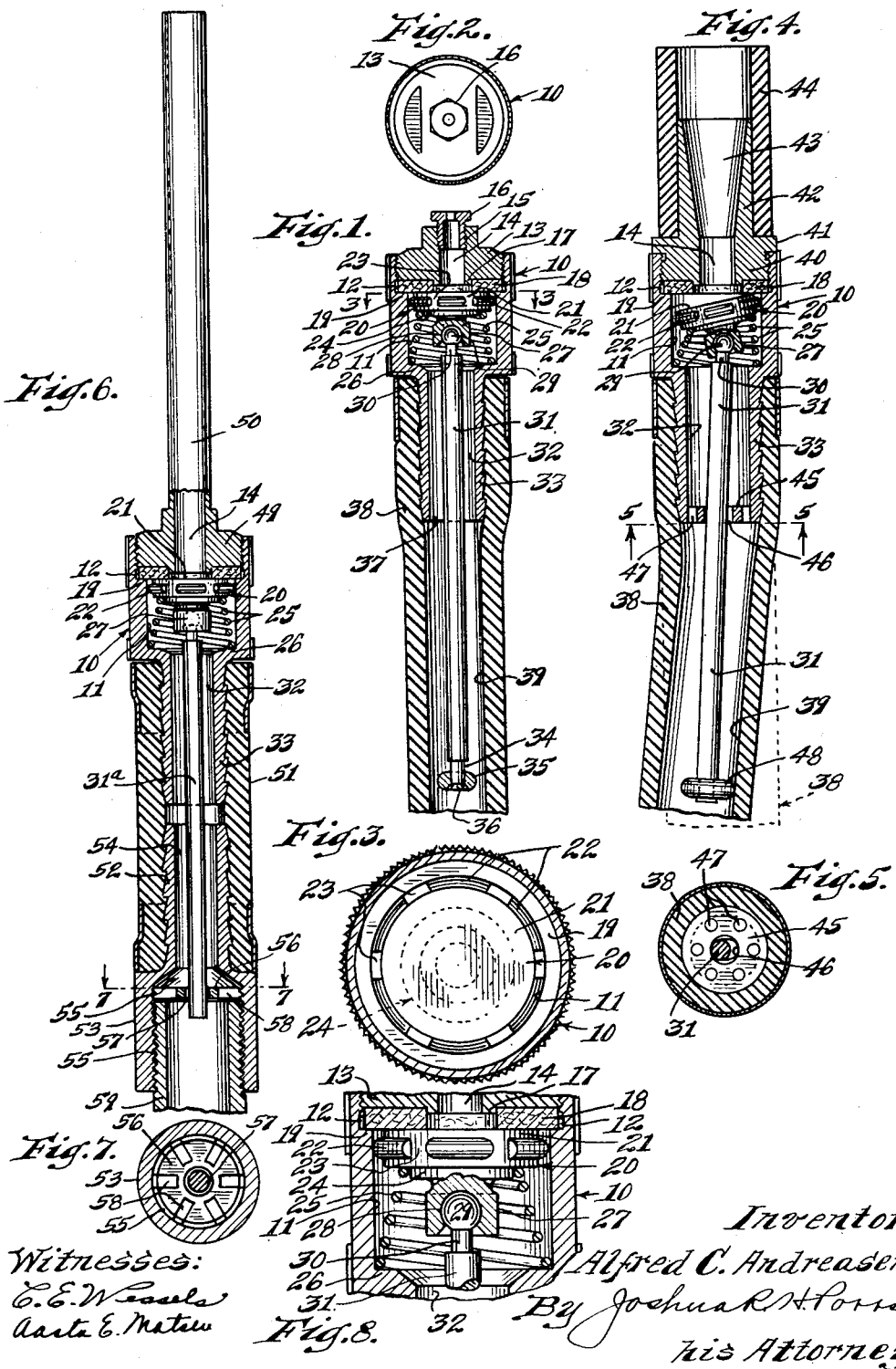

2,157,881

UNITED STATES PATENT OFFICE 2,157,881

VALVE MEANS

Alfred C. Andreasen, Oak Park, Ill.

Application February 9, 1938, Serial No. 189,629

19 Claims. (Cl. 251—115)

This invention relates to improvements in valve means. It has for an object the production of improved valve means whereby a valve may be operated in an improved and highly simple manner to turn on or shut off a flow of air or water or the like.

More specifically, I have provided a valve which is normally closed but which may be opened by merely making a slight bend between the valve elements and, for example, a flexible connection of the same.

In my construction, the water, for example, will be turned on during the time that the bend is in existence and will be automatically shut off when the parts are allowed to return to unbent or normal condition.

I am aware that previous attempts have been made along this line, as exemplified by the patent to Cottrell, No. 1,864,978. However, all of these previous attempts have been unsatisfactory. The Cottrell device has numerous disadvantages. The initial bending of the hose tends to force the rod to open the valve and further movement of the hose tends to work in the opposite manner, that is, to shut the valve on its seat, as will be manifest by inspection of the drawing, in addition to the fact that the valve structure is not located advantageously.

I have not only made great improvements in the nature of the valve itself, as will be hereinafter more apparent, but increased bending of the hose in connection with my device only tends to insure the fullest opening of the valve and the maintenance of the valve in its fully opened position.

There is no need with my device to speculate as to whether the hose has been bent too little or too much. Furthermore, my arrangement insures that the valve is open when it is desired to be open. Furthermore, another improvement is that my valve will open with a minimum of movement on the part of the hose, making it unnecessary for the operator of the device to strain to open the valve, and eliminate injury to the hose.

For example, with my device, an operator desiring to wash a car may use my device especially with its hose terminal protective covering. He may place the hose against the car for close work without any danger of marking the car. The slightest bend made between the valve housing and the housing coupling will insure the full opening of the valve for maximum effectiveness.

Another object has been to provide a valve of the character described, which is not only an improvement as aforesaid, but which is inexpensive to manufacture and simple to assemble, and one which will not have a number of parts requiring constant repair.

Other objects and advantages will become apparent and be brought out more fully in the following specification, reference being had to the accompanying drawing wherein:

Fig. 1 is a sectional view of the valve mechanism shown applied for the use of air;

Fig. 2 is a top plan view of the same;

Fig. 3 is a plan section along the line 3—3 of Fig. 1.

Fig. 4 is a section of a modified form shown applied for use with water;

Fig. 5 is a section along the line 5—5 of Fig. 4;

Fig. 6 is a section of a modified form shown applied for use with water;

Fig. 7 is a section taken on the line 7—7 of Fig. 6;

Fig. 8 is an enlarged view of the valve details of my invention.

In the form which I have selected for the purpose of illustrating the principle of my invention, and referring more particularly to Figs. 1-3, a knurled valve housing 10 has a valve chamber 11 and an enlarged internally threaded bore 12 adapted to receive an externally threaded housing cap 13 having a reduced small central bore 14, the upper or outer portion of which is threaded as at 15 to accommodate a threaded reducing nozzle fitting 16. The cap 13 has a ring flange 17 around the bore 14 adapted to position an apertured gasket 18 resting on shoulder 19 formed by the bore 12 of the valve housing 10, said gasket forming a valve seat, as will be readily understood.

Adapted to be seated upon said valve seat is a universal valve 20 having an upper face 21 adapted to lie against the gasket. The valve 20 has a bead 22, the diameter of which is only slightly less than the diameter of the valve chamber. It will be noted that the bead 22 is rounded, adapting any portion of the bead to be moved at an angle downwardly or upwardly as the case may be with reference to the wall of the valve chamber so that the valve may be moved away from a parallel seating position angularly or tangentially with respect to the valve seat at any point.

The bead 22 is provided with notches 23, forming escape openings around its periphery to permit the flow of air between the valve head and the wall of the valve chamber. The valve is also provided with a shoulder, boss or reducing portion 24, forming seating and positioning means for a helical spiral spring 25 which seats at its other end on the shoulder 26 of the interior of the housing. The valve head on portion 24 has a socket extension 27 having a spherical socket 28 opening inwardly, as clearly shown in Fig. 8, adapted to receive a ball 29 on or integrally formed with a reducing portion 30 of a rod 31, which extends through a bore 32 in the threaded or notched connection extension 33, extending from or which is integral with the valve housing. The bore of the connection extension 33 is smaller in diameter than the diameter of the valve chamber, as can be clearly seen in Fig. 1. Also, the rod is substantially smaller in diameter than the bore 32 of the connection extension 33.

The rod 31 has a reduced portion 34 at or adjacent its inner or free end supporting a rounded or spherical swiveling knob 35 slidable thereon by means of a flange 36. The connection extension 33 has an inner cylindrical face 37 forming the bore 32. A supply hose 38 is adapted to be pressed on to the extension 33, the hose having an inner cylindrical wall 39.

One of the principal objects of the foregoing construction is to control the flow of air in a simple, effective manner. To that end I provided means whereby air may be expelled from the nozzle of the device by merely bending the hose 38 sufficiently to rock the valve off its seat. This is accomplished because the inner wall of the hose 38 will exert a pressure against the swiveling knob 35 on the rod 31, which will fulcrum on the end of the inner cylindrical wall 37. This will result in the movement of the universal joint to rock the valve off its seat, as will be readily understood without detailed explanation. An illustration of the principle of the movement may be had from observation of Fig. 4.

It will be understood that normally the spring 25 and the air pressure tend to keep the valve seated upon its seat. It will thus be manifest that normally, when the device is held in one hand the power or supply will be shut off. Thus, normally, there is no waste of supply and when it is desired to supply air, all that is necessary is to give a slight bend in the supply hose adjacent the swiveling knob.

In Figs. 4 and 5 I have shown a modified form. This form is largely similar to that shown in Figs. 1, 2, 3 and 8 excepting for certain changes which may be found desirable for use with water instead of air. In this form, the cap 40 is somewhat different from cap 13 having a flange 41, the cap 40 being screwed into the threaded housing 12 the same way as did the cap 13.

The cap 40 has a nozzle extension 42 with an outwardly flared inner bore 43 registering with the bore 14. The nozzle extension 42 is adapted to receive a protecting hose piece or outlet 44.

When my device is used for washing an automobile or the like where it is essential to prevent any scratches which might result from metal to metal contact, the protecting hose piece will permit close contact with the article to be washed and at the same time prevent any marking or injury of the same.

In the form shown in Fig. 4, the connection extension 33 has a larger diameter and is provided with an end wall 45 having a central aperture 46 and a plurality of water ports 47. The rod 31 in the form shown in Fig. 4 extends through the central aperture 46 and is provided with a fixed knob 48.

In this form shown in Figs. 4 and 5, I have shown my invention adapted to supply water for the washing of a car, for example. In this case, the water will normally be shut off. When it is desired to supply water, the valve housing may be grasped with one hand and bent relatively with the hose that is grasped by the other hand. When this is done, the inner wall of the hose will fulcrum the rod 31 in the central aperture 46 in the end wall 45 to rock the valve off its seat, permitting the water to travel through the ports of the end wall and around the notches of the bead and out through the nozzle opening as in Fig. 1.

In the form shown in Fig. 4, it will be understood that the end wall 45 with its central aperture 46 serves as a fulcrum in the same way as the lower end of the inner wall of the extension 33 as at 37 in Fig. 1.

Because of the larger diameters used in the form shown in Fig. 4, it will be found preferable to use the end wall construction shown.

In the two forms already described, the structures were designed primarily for use with flexible supply hoses and in these cases, either the hose or the valve housing could be grasped and the hose bent to open the valve.

In the last form which I have shown in Figs. 6 and 7, the valve construction is adapted to be used most advantageously with a fixed non-flexing source of supply, as will be readily apparent hereafter. In the form shown in Figs. 6 and 7, the cap 49 is similar to the cap 13 excepting that it is provided with a tube 50, it being understood that this form of construction is also adapted for the use of water.

In the packing of sausages and such, one of the usual operations is a test operation to learn if the casing for the sausage is satisfactory before packing the sausage meat into the casing. The form of my construction shown in Figs. 6 and 7 is particularly adapted for this function inasmuch as the tube 50 may be inserted into the casing and water injected into the casing to expand the casing to the necessary size to make sure that the casing is leak-proof or otherwise suitable.

In the form shown in Figs. 6 and 7, there are also provided a housing valve and seat and joint and other details similar to those shown in Fig. 1. A coupling hose 51, which may be provided with the usual clamping rings, is pressed on the connecting extension 33 and to another connecting extension 52 of a coupling member 53.

The coupling member 53 has a reduced bore 54 and a large threaded bore 55, as is clearly shown in Fig. 6. A fulcrum ring 56 is threaded into the large threaded bore 55, the ring having a central aperture 57 and a plurality of ports 58 for water. The coupling 53 may be threaded onto a supply pipe 59 which may be stationary or fixed and nonflexing.

It will be understood from Fig. 6 that the rod 31a, which is much like the rod 31 of Fig. 1, extends through the bore 32 in the connecting extension 33 and then through the bore 54 in the coupling extension 52 all within the coupling hose 51 and thence through the central aperture 57 in the ring 56 and thence into the interior of the stationary pipe 59.

It will be observed from Fig. 6 that there is a space between the end of the extension 52 and the adjacent end of the extension 33, and when the construction shown in Fig. 6 is mounted in place on the stationary supply pipe 59, the water will normally be shut off, as illustrated in Fig. 6. Illustrating one of the many uses for the construction shown in Fig. 6, an operator may take a casing for a sausage and place the same on the tube 50. Then, all that is necessary is for the operator holding the casing on the tube to bend the hose 51 and thus move the construction in any direction whereby the valve will be automatically rocked off its seat, as a result of which water will be admitted into the casing. When it is desirable to stop the supply of water, all that is necessary is to release the hand and allow the structure to return to its natural position.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to secure by Letters Patent is:

1. In valve means, a valve housing, a valve for said housing, a conduit for said housing adapted to bend and means operative by the bending of the conduit for opening the valve, said means including a universal joint and a rod rigid with a section of the joint to move relative to the valve and conduit to a certain extent and with the conduit thereafter to a certain extent.

2. In valve means, a valve housing, a valve for said housing, a flexible conduit for said housing adapted to be flexed and means operative by the flexing of the conduit for opening the valve, said means including a universal joint, said valve being normally in closed position and a rod rigid with a section of the joint and having a shiftable terminal adapted to engage the conduit.

3. In valve means, a valve housing, a valve for said housing, a flexible conduit for said housing and means operative by the flexing of the conduit for opening the valve, said means including a rockable element extending in a direction opposite to the direction of flow of fluid through the housing adapted to be rocked by the conduit, and a universal connection between the rockable element and the valve.

4. In a valve and hose combination, a valve housing, a valve seat in said housing, a valve for said seat, a hose connected to said housing, a rod connected to said valve by a universal joint and extending into said hose, an enlarged globular element slidably mounted on the rod, said hose being adapted to bear against said element to open said valve.

5. In a valve and hose combination, a valve housing, a valve seat in said housing, a valve for said seat, a hose connected to said housing, a rod connected to said valve by a universal joint and extending into said hose, said hose being adapted to bear against said rod to open said valve, said rod being provided with a swiveling element at its free end.

6. In valve and hose combination, a valve housing, a valve seat in said housing, a valve for said seat, a hose connected to said housing, a rod connected to said valve by a universal joint and extending into said hose, said hose being adapted to bear against said rod to open said valve, said rod being pivotally held by a fixed coupling extension.

7. In valve means, a valve housing, a valve seat for said housing, a valve for said seat, a hose coupling for said housing, a connection extension adapted to be coupled to said housing by said hose coupling, a stationary source of supply, said connection extension adapted to be connected to said stationary source, and a rod having a toggle connection with the valve whereby said valve may be opened upon the movement of the parts coupled to the stationary source of supply.

8. In valve means, a valve housing, a valve seat for said housing, a valve for said seat, a hose coupling for said housing, a connection extension adapted to be coupled to said housing by said hose coupling, a stationary source of supply, said connection extension adapted to be connected to said stationary source, and means whereby said valve may be opened upon the movement of the device coupled to the stationary source of supply, said means including a rod having a universal connection to said valve and adapted to rock the valve off its seat.

9. In valve means, a valve housing, a valve for said housing having a bead adapted to register with the interior of the valve housing and permit the valve to rock in said valve housing, said valve being provided with escape openings around its periphery for the passage of a supply of a fluid, a hose on the housing, and a rod connected to said valve by means of a universal joint and extending into the hose whereby movement of said hose and valve relatively will rock said valve off its seat.

10. In valve and hose combination, a valve housing, a valve seat in said housing, a valve for said seat, a hose connected to said housing, a rod connected to said valve by a universal joint and extending into said hose, said hose being adapted to bear against said rod to open said valve, said rod being provided with a globular terminal.

11. In valve and hose combination, a valve housing, a valve seat in said housing, a valve for said seat, a hose connected to said housing, a rod connected to said valve by a universal joint and extending into said hose, said hose being adapted to bear against said rod to open said valve.

12. In valve means, a valve housing, a valve for said housing having an annular bead adapted to register with the interior of the valve housing and permit the valve to rock in said valve housing, said bead being provided with notches for the passage of a supply of a fluid, a conduit connected to the housing and adapted for angular movement relative thereto, and a lever in the housing and conduit and having a ball and socket connection with the valve, said lever adapted to fulcrum upon angular movement of the housing and conduit relatively to unseat the valve.

13. In valve means, a valve housing, a valve, a gasket forming a valve seat mounted against a shoulder in said housing, a cap for said housing adapted to be threaded in said housing and to hold said valve seat in position and being adapted to be adjusted to maintain said valve seat in position, said cap having a reduced tubular outlet, said valve having peripheral escape openings, a spring closing the valve, and a rod having a universal connection with the valve and adapted to fulcrum on a fixed member to unseat the valve when shifted angularly with respect to the housing and vice versa.

14. In valve and hose combination, a valve housing, a valve seat in said housing, a valve for said seat, a hose connected to said housing, a rod connected to said valve by a universal joint and extending into said hose, said hose being adapted to bear against said rod to open said valve, said rod being adapted to fulcrum at a point spaced from its connection with the valve when the valve is opened.

15. In valve means, a valve housing, a valve seat for said housing, a valve for said seat, a spring seated in the housing and acting on the valve to close the same against the seat, a hose coupling for said housing, a connection extension adapted to be coupled to said housing by said hose coupling, a stationary source of supply, said connection extension adapted to be connected to said stationary source, and means whereby said valve may be opened upon the movement of the device coupled to the stationary source of supply, said means including a rockable element having a swivel connection with the valve and a fulcrum adapted to rock the valve off its seat.

16. In a valve and hose combination, a valve housing, a valve seat in said housing, a valve for said seat, a hose connected to said housing, and a rod connected to said valve by a universal joint and extending into said hose, said hose being adapted to bear against said rod to open said valve, said rod being provided with a fulcrum beyond the valve.

17. In a valve and hose combination, a valve housing, a valve seat in said housing, a valve for said seat, a hose connected to said housing, a rod connected to said valve by a universal joint and extending into said hose, and a fulcrum for the rod causing the same to pivot in the manner of a lever to open said valve.

18. In a valve and hose combination, a valve housing, a valve seat in said housing, a valve for said seat, a hose connected to said housing, a rod connected to said valve by a universal joint and extending into said hose, a rigid extension associated with the housing, said extension having fulcrum point engaged by the rod upon bending the hose at an angle to rock the valve off its seat.

19. In a valve and hose combination, a valve housing, a valve seat in said housing, a valve for said seat, a hose connected to said housing, a rod connected to said valve by a universal joint and extending into said hose, a rigid extension associated with the housing, said extension having fulcrum point engaged by the rod upon disposing the hose at an angle to rock the valve off its seat, and means to seat the valve in conjunction with the fluid pressure in the hose and housing.

ALFRED C. ANDREASEN.